United States Patent Office 2,829,154
Patented Apr. 1, 1958

2,829,154

METHOD FOR THE ESTERIFICATION OF 2-HYDROXY-4-AMINO-BENZOIC ACID WITH PHENOLS

Carl Lund Jensen, Holte, Denmark, assignor to Løvens kemiske Fabrik ved. A. Kongsted, Copenhagen, Denmark No Drawing. Application August 24, 1956
Serial No. 605,948

Claims priority, application Great Britain
September 8, 1955

6 Claims. (Cl. 260—471)

This invention relates to a method for the production of esters of 2-hydroxy-4-amino-benzoic acid with phenols.

It is well known that the said esters are capable of inhibiting the growth of tuberculosis bacteria in considerably lower concentrations than the 2-hydroxy-4-amino-benzoic acid itself or its ester with lower aliphatic alcohols. Furthermore, it has now been found that when applying orally the ester of 2-hydroxy-4-amino-benzoic acid with phenol instead of the free acid in the treatment of human tuberculosis, most of the serious disadvantages connected with the use of the acid, such as ill-feeling, headache and gastrointestinal irritation, are to a very large extent avoided.

However, no technically workable method has hitherto been available for the production of the said ester by direct esterification, and consequently, it has been necessary to use indirect methods involving several steps, f. inst. those described in the U. S. patent specification No. 2,604,488 and the French patent specification No. 1,074,919.

An object of the present invention is the production of esters of 2-hydroxy-4-amino-benzoic acid with phenols in a simpler way enabling the ester to be produced in one step, at the same time securing a high yield of a relatively pure product so that the overall yield (after purification) will be high.

Other objects of my invention will appear from the following description of the general way in which the method is carried out and of specific examples representing modes of carrying my invention into effect and from the claim.

Generally, my present method of producing esters of 2-hydroxy-4-amino-benzoic acid with phenols consists in heating the said acid with the phenol in question to a temperature of 80° C. or higher, preferably, however, not higher than 120° C., in the presence of either phosphorus pentoxide or polyphosphorus acids containing more than 75% phosphorus pentoxide, preferably more than 80% phosphorus pentoxide for so long a time that the formation of the ester has been fulfilled, and isolating the ester thereby formed.

Surprisingly, no decarboxylation occurs in this treatment in spite of the fact that 2-hydroxy-4-amino-benzoic acid is well known to be very inclined to split off carbon dioxide when heated.

Satisfactory yields will only be obtained in this process when the phenol is used in excess of the amount stoechiometrically required in the formation of the ester. Very satisfactory yields are obtained when 2.5 to 8.0 mols of the phenol in question are used to each mol of 2-hydroxy-4-amino-benzoic acid. The most advantageous ratio within this range depends, however, upon whether phosphorus pentoxide or polyphosphorus acid is used for condensing agent. Thus, when using phosphorus pentoxide the highest yields are obtainable when 5 to 8 mols of the phenol are used to each mol of 2-hydroxy-4-aminobenzoic acid, whereas when polyphosphoric acids are used the highest yields are obtained by employing the ratio of 2.5 to 4 mols of the phenol to each mol of 2-hydroxy-4-amino-benzoic acid. Maximum yields are obtained by using about 3.2 and 4.4 mols of the phenol to each mol of 2-hydroxy-4-amino-benzoic acid respectively.

Also the amount of phosphorus pentoxide or polyphosphoric acid present during the esterification process influences the yields obtained. Irrespectively whether phosphorus pentoxide or polyphosphoric acid is used, however, satisfactory yields are obtainable when the ratio of the $P_2O_5$ contents thereof to the 2-hydroxy-4-amino-benzoic acid of the reaction mixture is within the range of 1.6 to 3.2 mols $P_2O_5$ to each mol 2-hydroxy-4-amino-benzoic acid, the preferred ratio at which the maximum yield will be obtained, being about 2.2.

When using polyphosphoric acid the yield depends moreover under conditions which are otherwise optimal upon the contents of $P_2O_5$ in the polyphosphoric acid as shown by the following table:

| Percent $P_2O_5$ | Percent yield of non-purified ester |
|---|---|
| 80.8 | 80.0 |
| 84.0 | 84.0 |
| 88.5 | 86.6 |

When using a polyphosphoric acid containing less than 80% the yield of the ester decreases sharply; it is still satisfactory with a polyphosphoric acid containing down to 75% $P_2O_5$, but with polyphosphoric acid containing 71% $P_2O_5$ or less, no ester can be obtained at all.

The manner in which my invention is carried out is further illustrated by the following examples, although the invention is not limited to the conditions, components or proportions mentioned therein which may be varied within the scopes of the appended claims.

*Example 1*

5.0 g. 2-hydroxy-4-amino-benzoic acid, 10.0 g. phenol and 15.0 g. polyphosphoric acid, containing 82.7% $P_2O_5$ are mixed and the mixture is heated to 100° C. for 2 hours while stirring, whereafter the reaction mixture is poured into 100 ml. water. The solid substance thereby separated out is filtered off, washed on the filter with a dilute solution of sodium carbonate, dried at 75° C., and subsequently extracted with 150 ml. hot benzene. A small amount of insoluble material is filtered off, and the filtrate is evaporated to dryness. Thereby, 6.1 g. of the phenyl-ester of 2-hydroxy-4-amino-benzoic acid are obtained as a yellow crystalline product with M. P. 147–9° C. Yield: 81.8%.

The product thus obtained can be purified as follows:
5.0 g. of the yellow raw product, 0.3 g. zinc dust, 0.3 g. ammonium chloride, and 50 ml. 96% ethanol are mixed, and the mixture is boiled with reflux for 10 minutes. Thereafter, 0.3 g. decolorizing carbon are added, and the mixture is boiled with reflux for further 5 minutes. The suspension is subsequently filtered, to the filtrate is added 50 ml. water, and the solution is cooled to 5° C. Thereby, the phenyl ester separates out as white crystals, which are filtered off. After drying at 75° C. the purified product weighs 4.5 g. and has M. P. 148–50° C. Overall yield: 73.6%.

When the crude product is purified as hereinbefore described the extraction with benzene can be omitted, whereby the overall yield is increased to about 78%.

Example 2

5.0 g. 2-hydroxy-4-amino-benzoic acid, 20.0 g. phenol, and 10.0 g. phosphorus pentoxide are mixed and the mixture is heated to 100° C. for 2 hours while stirring, whereafter the reaction mixture is worked up as described in Example 1. After the treatment with benzene a slightly brown product is obtained with M. P. 149–150° C. Yield: 80%.

By dissolving the crude product in hot ethanol and adding an equal volume of water, white crystals are obtained with M. P. 149–150° C. Overall yield: 67.5%.

I claim:

1. A method for production of esters of 2-hydroxy-4-amino-benzoic acid with phenol in which a mixture of the said acid, phenol and a member of the group consisting of phosphorus pentoxide and polyphosphorus acids containing more than 75% phosphorus pentoxide is heated to a temperature higher than 80° C. for so long a time that formation of the ester has been fulfilled, after which the ester thereby formed is isolated.

2. The method of claim 1 in which the mol ratio of condensing agent based on $P_2O_5$ content to benzoic acid reactant is about 1.6 to 3.2 mols of $P_2O_5$ content to 1.0 mol of benzoic acid reactant.

3. The method of claim 2 in which the mol ratio of condensing agent based on $P_2O_5$ content to benzoic acid reactant is about 2.2 to 1.0.

4. The method of claim 1 in which the polyphosphoric acid having a $P_2O_5$ content of about 80.8% is used as condensing agent.

5. The method of claim 1 in which the polyphosphoric acid having a $P_2O_5$ content of about 84.0% is used as condensing agent.

6. The method of claim 1 in which the polyphosphoric acid having a $P_2O_5$ content of about 88.5% is used as condensing agent.

References Cited in the file of this patent

UNITED STATES PATENTS

| | | |
|---|---|---|
| 625,158 | Einhorn | May 16, 1899 |
| 2,604,488 | Freire | July 22, 1952 |

OTHER REFERENCES

Groggins: "Unit Proc. in Org. Syn.," pp. 607 to 609, McGraw-Hill, 1952.